United States Patent Office 3,380,232
Patented Apr. 30, 1968

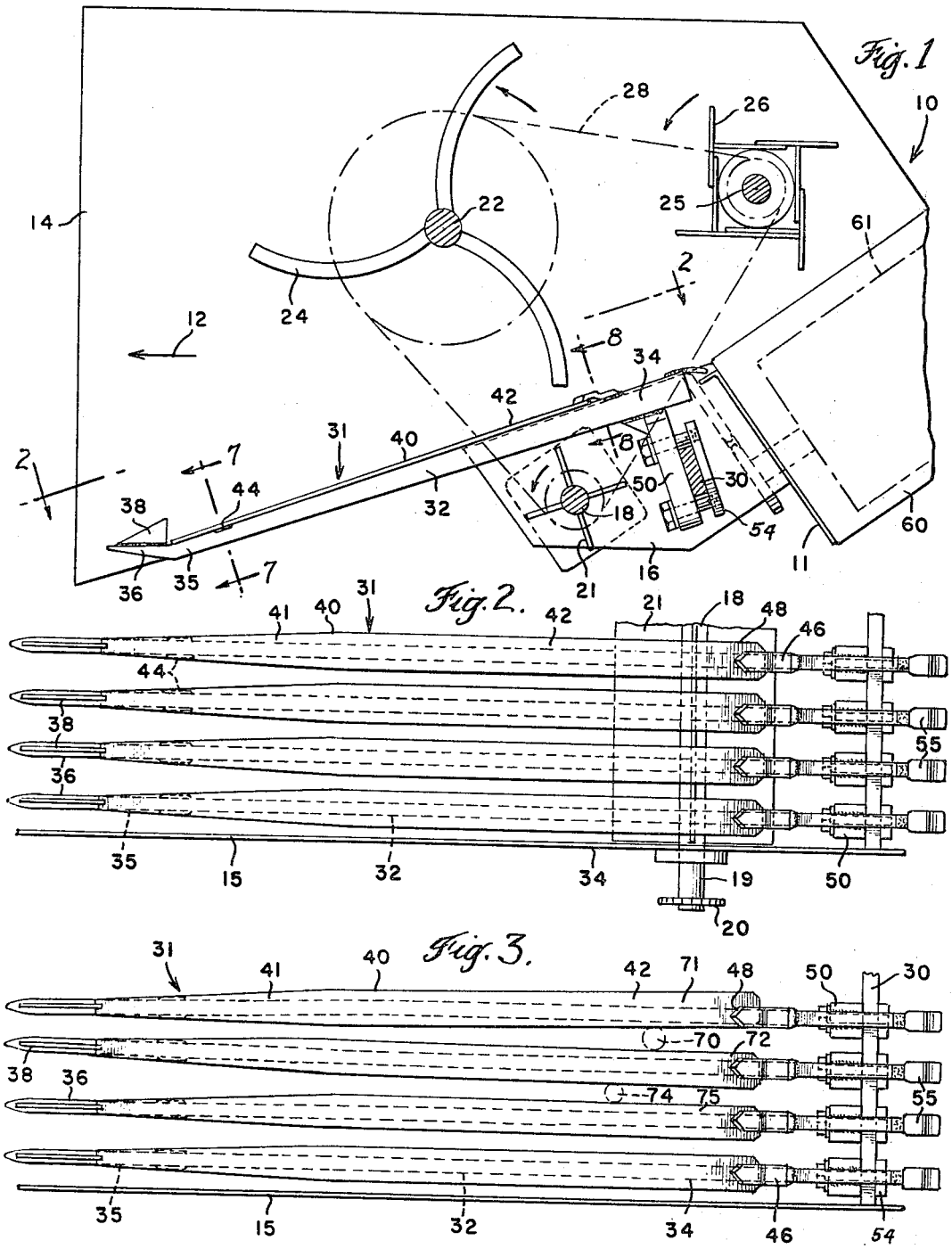

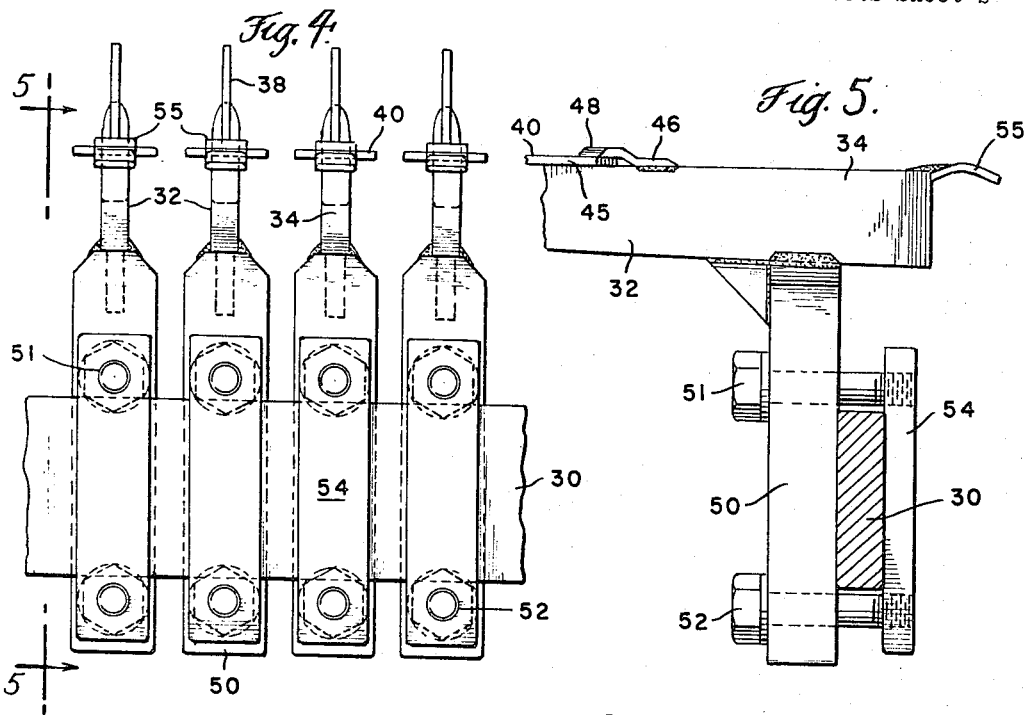
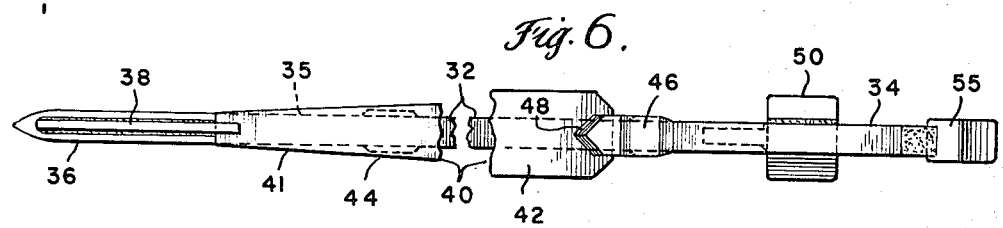
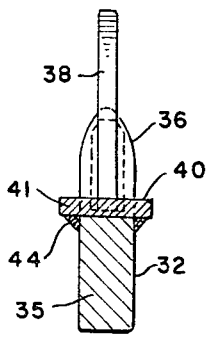
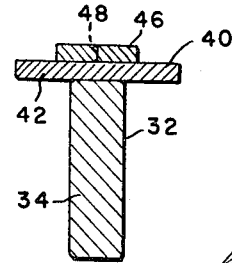
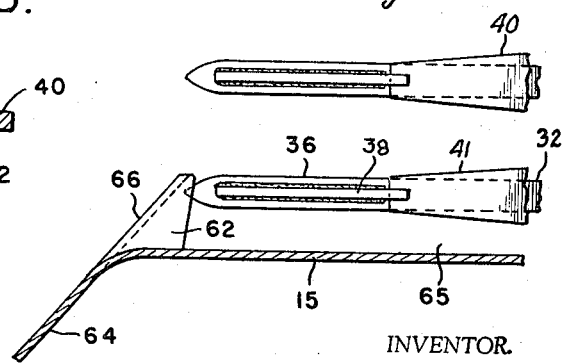
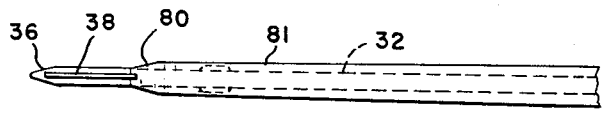
INVENTOR.
HENRY J. JEZEK
BY
ATTORNEY

3,380,232
COTTON STRIPPER
Henry J. Jezek, 1204 E. Downs Ave.,
Temple, Tex. 76501
Filed Aug. 13, 1965, Ser. No. 479,474
11 Claims. (Cl. 56—34)

The present invention relates generally to cotton harvesters and particularly to finger type cotton stripper machines. Still more specifically, the invention relates to an improved finger design for a cotton stripper. The stripper finger of this invention is an improvement in the structure shown in U.S. Patent No. 3,067,561 date Dec. 11, 1962 and the Reissue patent thereon No. 25,667, dated Oct. 27, 1964.

In harvesting stripper cotton, a variety of field conditions are encountered. The stalks and the stems of the plants are not uniform either as to thickness or location. The header units of finger type cotton stripper machines must, therefore, be adaptable to the various field situations as they are encountered. When standing cotton plants are engaged by stripper fingers on forward travel of a machine, some plants may be pulled from the ground if the stripper fingers are too closely spaced, because the main bodies of some plants may become wedged between adjacent fingers. If the fingers are too widely spaced, a less efficient stripping action will result and cotton will be missed.

One object of this invention is to provide a cotton stripper machine having improved stripper fingers which will remove cotton from standing plants more effectively than fingers of prior design.

Another object of this invention is to provide improved cotton stripper fingers having portions which flex and move laterally responsive to engagement with standing cotton plants and operate in conjunction with similar adjacent stripper fingers to effectively remove cotton from plants.

Another object of this invention is to provide a cotton stripper machine of the character described wherein its stripper fingers are mounted to be adjusted laterally and positioned relative to each other, as desired, to produce a desired arrangement of stripper fingers.

A further object of this invention is to provide a cotton stripper finger so designed that cotton and other material will not become caught on the fingers during stripping and conveying operations.

A still further object of this invention is to provide a cotton stripper machine wherein cotton will be effectively stripped from a standing plant by stripper fingers which are of a low cost, simple design relative to their operative characteristics.

Other objects of this invention will be apparent hereinafter from the specification and from the recital in the appended claims.

In the drawings:

FIG. 1 is a longitudinal vertical section of a cotton stripper machine and showing one of the stripper fingers thereon constructed according to this invention;

FIG. 2 is a partial, enlarged, plan view taken on the line 2—2 of FIG. 1 looking in the direction of the arrows and showing four of the stripper fingers of the header unit;

FIG. 3 is a view similar to FIG. 2 but showing cotton stalks between the stripper fingers and showing the flexing and deflection of the fingers responsive thereto;

FIG. 4 is an enlarged end view showing the adjustable mounting for the stripper fingers;

FIG. 5 is a fragmentary section taken on the line 5—5 of FIG. 4 looking in the direction of the arrows;

FIG. 6 is a broken plan view of one of the stripper fingers;

FIG. 7 is an enlarged section taken on the line 7—7 of FIG. 1 looking in the direction of the arrows;

FIG. 8 is an enlarged section taken on the line 8—8 of FIG. 1 looking in the direction of the arrows;

FIG. 9 is a fragmentary plan view showing the forward ends of two stripper fingers and the guard element used in relation to the outside stripper finger; and FIG. 10 is a plan view showing a modified form of finger design.

Referring now to the drawings by numerals of references, and particularly to FIG. 1, 10 denotes generally a cotton stripper machine having a frame structure 11 supported for travel in a forward direction, as indicated by the arrow 12. Frame 11 has laterally spaced side walls 14 and 15 which extend vertically. Extending transversely and rotatably supported on side plate extensions 16 is a rotatable shaft 18 having an outwardly projecting portion 19 (FIG. 2) to which a sprocket 20 is affixed. Shaft 18 is driven from a suitable source of power, not shown; it carries radially extending blades 21 which travel in a counterclockwise direction when viewed as shown in FIG. 1. Shaft 18 and radial members 21 form what is commonly called a "stalk walker" which operates to pull the standing cotton plants downwardly on forward travel of the harvester and after the plants enter the machine.

Located above and forwardly of shaft 18 is a transverse shaft 22 having arcuately shaped paddle members 24 which also sweep in a counterclockwise direction. Rearwardly of these paddles is a transverse shaft 25 having sweep elements 26 which also travel counterclockwise. These three rotatable elements are interconnected by an endless member 28, preferably a chain rotatable around suitable sprockets. The drive is from sprocket 20 on shaft 18.

Rearwardly of shaft 18 and extending horizontally transversely relative to the frame 11 is a mounting member 30 which is rectangular in cross section. Member 30 serves as a support and mounting means for a series of cotton stripper fingers 31 which extend in parallel, side-by-side, and fore-and-aft relation between the walls 14 and 15 of the machine frame. Preferably, about ten stripper fingers are employed to handle one cotton row. Each stripper finger comprises an elongated inclined body 32 of plate steel which extends downwardly from an upper rearward end 34 to a forward end 35. Body 32 is of uniform thickness laterally from end to end and of diminishing thickness in a vertical direction from its rearward to its forward end. Further, the vertical thickness of the member throughout its length is substantially greater than the lateral dimension of the body. Each body 32 is of such material and design that it is relatively rigid and unbendable in a vertical direction but relatively flexible and bendable laterally. The forward end 35 of each body has a toe 36 on which a triangularly shaped boll catcher 38 is mounted.

Each stripper finger has a stripper plate 40 which is mounted on top of body 32. It will be noted, as shown in FIGS. 2 and 3, that each stripper plate is substantially wider than its associated body 32, and projects laterally on opposite sides thereof, for a major portion of the length of the stripper plate. Each stripper plate is made of sheet metal and it has a tapered forward end 41 and a rearward end 42 the sides of which are parallel. At a location slightly spaced rearwardly from the toe 36, each stripper plate is connected fixedly by welding 44 (FIGS. 2, 3 and 7) to the adjacent forward end 35 of its associated body. Throughout the remainder of its length, each stripper plate is free and not connected to the finger body beneath it.

The top surface of each body 32 is generally rectilinear and each stripper plate 40 extends parallel to it.

The forward end 41 of each stripper plate is held fixedly in place by the welding 44. The rearward end 42 of each plate is held against upward movement relative to body 32 by a retainer piece 46 (FIG. 8) which is welded to body 32, as shown in FIG. 5, and projects upwardly and forwardly over the end of plate 40. Each retainer 46 has a V-shaped forward end 48. These ends 48 provide rearwardly inclined walls, as shown, which serve as camming surfaces to direct crop material laterally outwardly relative to the stripper fingers on forward motion of the machine.

Projecting downwardly from each body 32 is a leg 50, shown best in FIGS. 4 and 5. Leg 50 is perpendicular to the upper surface of body 32 and it carries a pair of bolts 51 and 52 which straddle and project rearwardly above and below support member 30. The bolts thread into a vertically extending strap 54 which produces a clamping action on the support member 30 when the bolts are tightened. With this design, fingers 31 are adapted to be laterally adjusted on member 30 to facilitate assembly of the machine and to enable an operator to set the stripper fingers as he desires in the field. Further, the angular position of each finger may be properly adjusted to compensate for manufacturing variations.

It will be noted particularly from FIG. 5, that the leg 50 of each body member 32 is spaced forwardly from the rearward terminal end of the body. Also, each stripper finger has a rearwardly extending arcuate tab 55 over which cotton may smoothly flow to a trough 60 (FIG. 1) having a conveying auger diagrammatically illustrated at 61.

The outside stripper fingers between side walls 14 and 15 are each provided with a guard 62, as shown in FIG. 9. Side 15 is flared laterally outwardly at 64 to provide a diagonal surface to direct cotton plants inwardly toward the stripper fingers. Guard 62 projects inwardly a sufficient distance in front of the toe 36 of the adjacent outside finger 32 to prevent standing cotton plants from passing between the finger and wall 15. The diagonal front face 66 of the guard 62 is an extension of the outwardly flared portion 64 of the side 15. With this structure, the cotton plants must always pass between two stripper fingers. The plants are prevented from passing between an outside stripper finger and the adjacent wall of the harvester frame.

The operation of the stripper fingers on forward travel of the machine can best be seen from FIG. 3, and a comparison with FIG. 2. A stalk 70 is shown between stripper fingers denoted 71 and 72 and a smaller stalk 74 is shown between stripper finger 72 and another finger 75. The stalk 70 is of a diameter greater than the space between the side edges of the plates 40 on fingers 71 and 72. Thus, the stalk pushes the stripper plate on finger 71 laterally in one direction and the plate on finger 72 laterally in the opposite direction. At the same time, the forward, lower, free ends of the stripper finger bodies are flexed and caused to be moved toward each other to narrow the normal spacing between the forward ends of the fingers. Therefore, the flexible bodies 32 of the stripper fingers have their forward ends 35 flexed and bent laterally inwardly relative to their rearward ends 34 fixedly connected to the mounting member 30. At the same time, the rearward ends 42 of the stripper plates 40 on the stripper bodies are pushed laterally outwardly and in opposite directions respectively to the forward ends of the bodies on which they are carried. Thus, the forward end of each stripper body is moved in one direction laterally relative to its rearward end while the stripper plate on it moves laterally relative to the rearward end of the stripper body but in an opposite direction.

This lateral movement of the forward ends 35 of the bodies 32 and the rearward ends 42 of the stripper plates 40 enables the fingers to self-adjust and accommodate various cotton plant conditions. The fingers have a "snake" action as they spread and then close around the stalks of incoming cotton plants. The stalk-walker roll members 21 pull the plants downwardly relative to fingers 31 whereby the cotton is stripped from the plants and left on top of plates 40. Cotton material is then swept rearwardly by the paddles 24 and the material moves smoothly over the retainers 46. The V-shaped forward ends 48 of these retainers direct the material laterally so that it will not become lodged on the fingers. The arcuate tabs 55 insure that the material easily passes rearwardly into the auger trough 60. The members 26 on shaft 25 assist in this flow of material.

In FIG. 10, a modified figure design is shown. The finger is constructed the same as shown in the fingers previously described except that the forward end of stripper plate 40 is sharply tapered at 80 and rearwardly thereof it has a second tapered section 81 having a taper at a lesser angle. At approximately the midway point in the length of the stripper plate, the side edges of the plate become parallel. This design results in substantial lateral movement of the cotton plants at the tip ends of the stripper fingers and a more gradual movement thereafter. Further, the amount of space between the forward sections of the stripper members is restricted whereby smaller cotton bolls are prevented from falling between adjacent stripper fingers.

While this invention has been described in connection with two embodiments thereof, it will be understood that it is capable of further modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A cotton stripper machine comprising a frame adapted for ground travel in a forward direction, a mounting member on said frame and extending generally horizontally transverse to said direction of travel, a plurality of elongated stripper fingers extending in spaced side by side relation to each other, each finger having a body inclined downwardly and forwardly from an upper rearward end to a free lower forward end, means connecting the rearward end of each body to said mounting member, each body having a generally rectilinear top surface, a stripper plate mounted on the top surfaces of each body parallel thereto and having a portion laterally slidable thereon, each stripper plate having a substantial portion of its length wider than its associated body and projecting laterally on opposite sides thereof, means fixedly connecting a forward end only of each stripper plate to its body forward end, a retainer projecting over the rearward end of each plate and which prevents upward movement of the plate rearward end relative to its body and permits lateral movement of said rearward end, the body of each finger being relatively rigid and unbendable in a vertical direction and relatively flexible and bendable in a lateral direction whereby each body forward end and the rearward end of the stripper plate on it may move laterally relative to the body rearward end and in opposite directions, respectively, relative thereto.

2. A cotton stripper machine as recited in claim 1 wherein a guard is mounted on said frame and projects diagonally therefrom in front of the forward end of the body of the adjacent stripper finger to insure that standing cotton plants will pass between two stripper fingers and not between said frame and said adjacent stripper finger.

3. A cotton stripper machine as recited in claim 1 wherein each retainer has a V-shaped wall facing forward to deflect material laterally relative to its finger body.

4. A cotton stripper machine as recited in claim 3 wherein the V-shaped wall of each retainer is rearwardly inclined.

5. A cotton stripper machine as recited in claim 1 wherein said means connecting said body to said mounting member straddles the mounting member and includes releaseable elements whereby said fingers may be adjusted toward and away from each other.

6. A cotton stripper machine as recited in claim 1 wherein each body has a downwardly projecting leg generally perpendicular to the body and spaced forwardly from the rear thereof, said means connecting said body rearward end to said mounting means being attached to said leg.

7. A cotton stripper finger comprising an elongated generally rectilinear body portion adapted to extend on an incline from a supported rearward end to a free and unsupported forward end, a stripper plate coextensive with and mounted on top of said body, said stripper plate having a substantial portion to its length wider than said body and projecting laterally on opposite sides thereof, means affixing a forward end only of said stripper plate to said body forward and, the rearward end of said stripper plate being slidable laterally on said body, and said body being relatively rigid and unbendable in a vertical direction and relatively flexible and bendable in a lateral direction whereby said body forward end and said stripper plate rearward end may move laterally relative to the body rearward end and in opposite directions, respectively, relative thereto.

8. A cotton stripper finger as recited in claim 7 wherein said means affixing said stripper plate forward end to said body comprises welding on the underside of the plate and the sides of said body, the weld extending for only a short distance relative to the length of the stripper plate.

9. A cotton stripper finger as recited in claim 7 wherein said body is of substantially uniform width from said forward end to said rearward end, and wherein said stripper plate forward end is the same width as said body and the plate rearward end is substantially wider.

10. A cotton stripper finger as recited in claim 7 wherein said stripper plate forward end is tapered, being narrower forwardly and wider rearwardly, the major portion of said plate rearwardly of said forward end having parallel sides.

11. A cotton stripper finger as recited in claim 7 wherein said stripper plate has a sharply tapered forward end, followed by another portion which has less taper, and then a rearward section which has parallel sides.

References Cited
UNITED STATES PATENTS

| | | | |
|---|---|---|---|
| 2,616,236 | 11/1952 | Hartley | 56—34 |
| 3,067,561 | 11/1962 | Jezek | 56—34 |
| Re. 25,667 | 10/1964 | Jezek | 56—34 |

RUSSELL R. KINSEY, *Primary Examiner.*